United States Patent

[11] 3,546,375

| [72] | Inventor | George G. Vitt, Jr.<br>Los Angeles, California |
|---|---|---|
| [21] | Appl. No. | 488,440 |
| [22] | Filed | Sept. 20, 1965 |
| [45] | Patented | Dec. 8, 1970 |
| [73] | Assignee | Hughes Aircraft Company<br>Culver City, California<br>a corporation of Delaware |

[54] THREE-DIMENSIONAL TERRAIN MAPPING SYSTEM
9 Claims, 10 Drawing Figs.

[52] U.S. Cl. ................................................. 178/6.5,
178/6.7, 178/6.8; 343/5, 343/6, 343/7.9, 343/17;
356/2
[51] Int. Cl. .................................................... H04n 7/18,
H04n 9/54
[50] Field of Search .......................................... 178/6, 6.5,
6.7, 6.8; 88/1(u); 343/5(MM), 5(CM), 6(TV),
7.9, 12, 17

[56] References Cited
UNITED STATES PATENTS
2,845,620   7/1958   Hammond ..................... 343/5(CM)
3,102,260   8/1963   Mihelich ....................... 343/5(MM)
3,191,170   6/1965   Lustig ............................ 343/5(CM)
3,324,238   6/1967   Stavis ............................ 178/6.5
3,242,484   3/1966   Russell .......................... 343/5(CM)
3,379,827   4/1968   Rossoff .......................... 178/6.5

*Primary Examiner*—Robert L. Griffen
*Assistant Examiner*—Joseph A. Orsino, Jr.
*Attorneys*—James K. Haskell and Don O. Dennison

ABSTRACT: An airborne system for obtaining three-dimensional, real-time round maps. The system utilizes a source of repetitive high intensity light pulses which are directed in fan-shaped beams having arcuate wave-fronts directly downward to illuminate sequential parallel strips of the terrain under observation. The ground velocity of the points of intersection of the wave fronts along the terrain is observed by appropriate imaging devices. Operation is based on the principle that the ground velocity of an intersecting wave front is predictable for flat and level terrain. The ground velocity for irregular terrain can be compared with the predicted ground velocity for flat terrain to yield information which is then displayed for stereoscopic viewing.

PATENTED DEC -8 1970

INVENTOR.
GEORGE G. VITT, JR.,
BY
ATTORNEY.

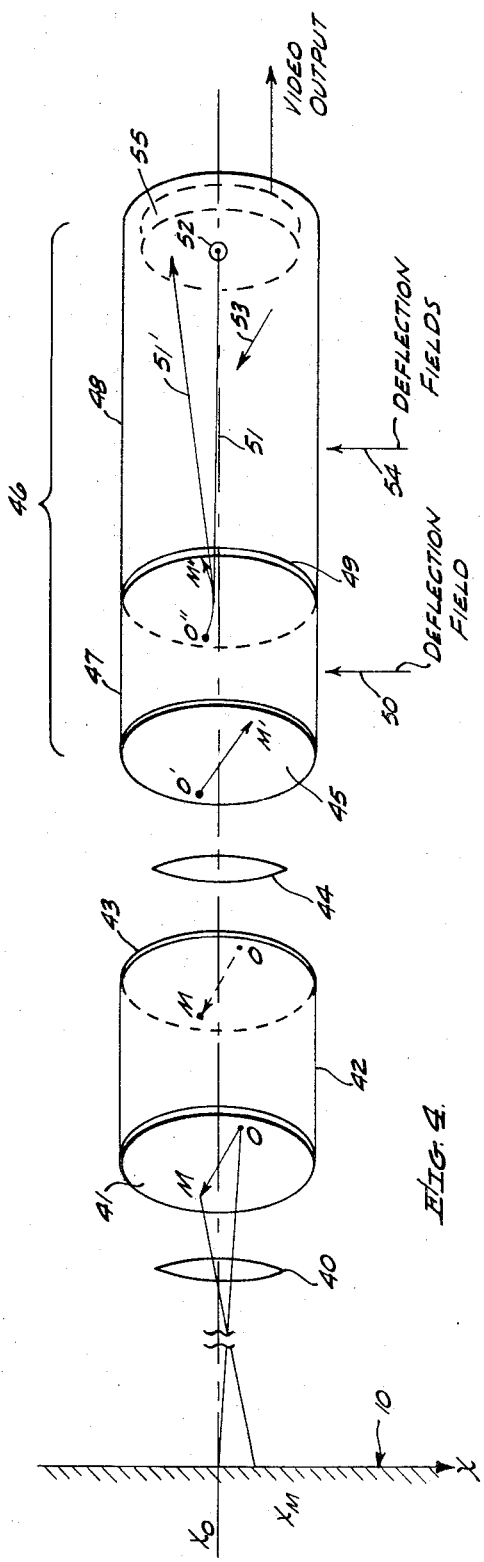
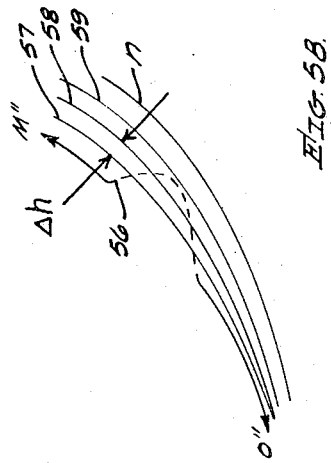
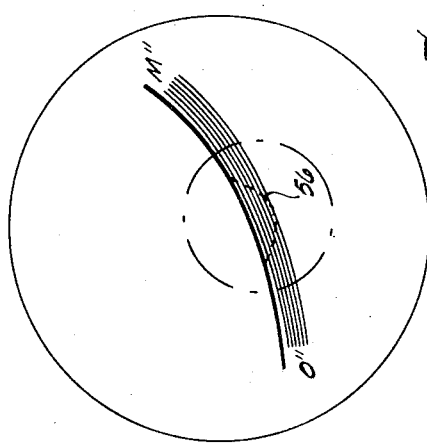
Fig. 4.
Fig. 5A.
Fig. 5B.
INVENTOR.
GEORGE G. VITT, JR.,
ATTORNEY.

INVENTOR.
GEORGE G. VITT, JR,
BY
ATTORNEY.

THREE-DIMENSIONAL TERRAIN MAPPING SYSTEM

This invention relates to terrain reconnaissance and more specifically to airborne systems and methods for obtaining three-dimensional real time ground maps.

In the past a great number of systems have been suggested for three-dimensional airborne reconnaissance. The more recent of these systems have included high intensity, highly directional, coherent light sources such as lasers. Such prior attempts at obtaining three-dimensional real-time ground maps have suffered many shortcomings. Among the more important of these are, first, their inability to achieve suitable angular resolution without employing a great number of highly directional receivers. Secondly, many of these devices require a large number of elements for storing range and reflectivity information, thereby adding to their cost and complexity. Thirdly, many such devices also require so-called "fiber-optic bundles" which are not only complex and costly, but also fragile.

It is a broad object of the present invention to provide an improved system for obtaining three-dimensional real-time ground maps by the use of high intensity light sources.

It is another object of the present invention to provide an improved and simplified system for obtaining three-dimensional real-time ground maps.

In addition to the disadvantages of the prior art devices mentioned above, many such devices also require electromechanical visual display devices such as multilenticular optical paths, oscillating or flexed fiber optic bundles and oscillating lenses and image planes.

Accordingly, it is yet another object of the present invention to display visual three-dimensional terrain information in real-time by nonmechanical means.

In accordance with the principles of the present invention, the above-mentioned objects are accomplished in a system utilizing an airborne pulsed light source producing a fan-shaped beam having an arcuate wavefront substantially orthogonal to the line of flight. The ground velocity of the points of intersection of this wavefront along the terrain is observed. Operation is based on the principle that the ground velocity of the intersecting wavefront is predictable on flat and level terrain. The ground velocity for irregular terrain can be compared with the predicted ground velocity for flat terrain to yield information which can be displayed visually as a three-dimensional image or can be recorded on photographic film for later use.

A feature of the present invention is a composite image-processing device which in its first section converts the one-dimensional line image of the illuminated terrain to a two-dimensional image containing ground velocity and reflectivity information. The comparison of this image with that obtained from flat and level terrain is thereupon made by a second section of the composite image processing device. The output is then applied to a pair of display devices for displaying right and left eye information for stereoscopic viewing.

The above-mentioned and other features and objects of this invention will become more apparent by reference to the following description taken in conjunction with the accompanying drawings, in which:

FIG. 4 is a simplified pictorial view of the image intensifier and the composite image-processing device employed in the present invention;

FIGS. 5A and 5B are enlarged views of the two-dimensional image displayed on the target of the image processing device of FIG. 4;

Figure 1:
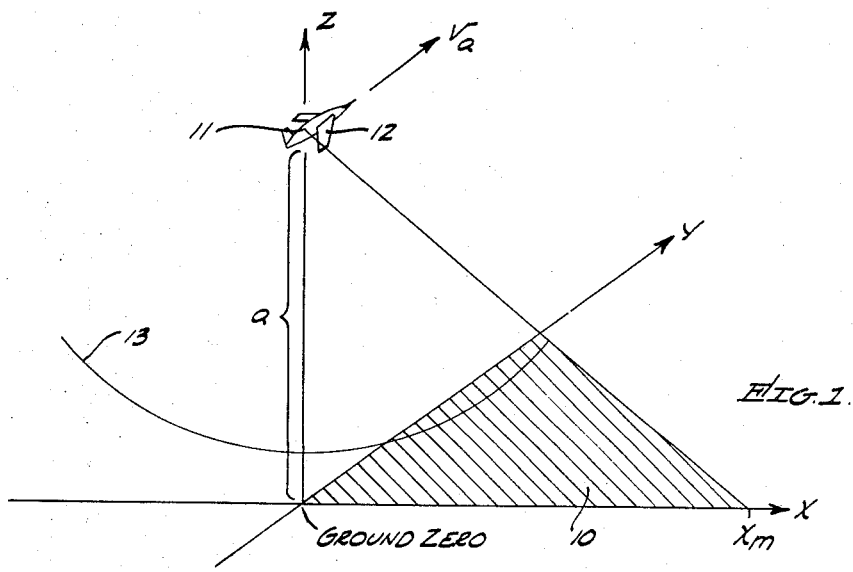
FIG. 1 is a pictorial illustration of typical level terrain helpful in explaining the principles of the present invention.

Referring more specifically to the drawings, FIG. 1 is a pictorial sketch of typical level terrain. In FIG. 1 surface 10 represents an area of the earth with no substantial terrain variations, natural or man-made. For the sake of convenience, an arbitrary coordinate system x, y, z has been assigned. Coordinates x and y define the plane of a flat and level surface in the area of interest. Coordinate z is at right angles to coordinates x and y and defines the direction away from the center of the earth.

An aircraft 12 is shown at an altitude a above the earth traveling at a velocity $v_a$ in a direction parallel to coordinate y.

At a time arbitrarily defined as t =0 a short burst or pulse of electromagnetic wave energy is emitted from a source 11 on the aircraft 12. Generally, the time duration of such pulse is a fraction of a microsecond. The train of electromagnetic wave energy comprising the pulse contains frequency components which can extend over a range which includes the infrared, visible and ultraviolet regions. For the sake of convenience, however, the pulse will be termed a light pulse.

By appropriate focusing means well known in the art, the emitted light pulse is focused into a fan-shaped beam lying substantially in the x-z plane and having a narrow extent in the y direction. The resulting beam propagates in the direction of surface 10 where it is shown as having an arcuate wavefront 13 adjacent the surface at ground zero directly below aircraft 12. Thus, the light pulse illuminates a narrow strip of surface 10 directly beneath aircraft 12.

A portion of the light-striking surface 10 is reflected thereby in the reverse direction and is received at aircraft 12 by apparatus to be described in greater detail hereinbelow. The time taken for the light to make the excursion from aircraft 12 to any point of surface 10 and back again is, of course, primarily dependent upon the distance between that point and the aircraft. The maximum range of illumination is designated $x_m$.

Figure 2:
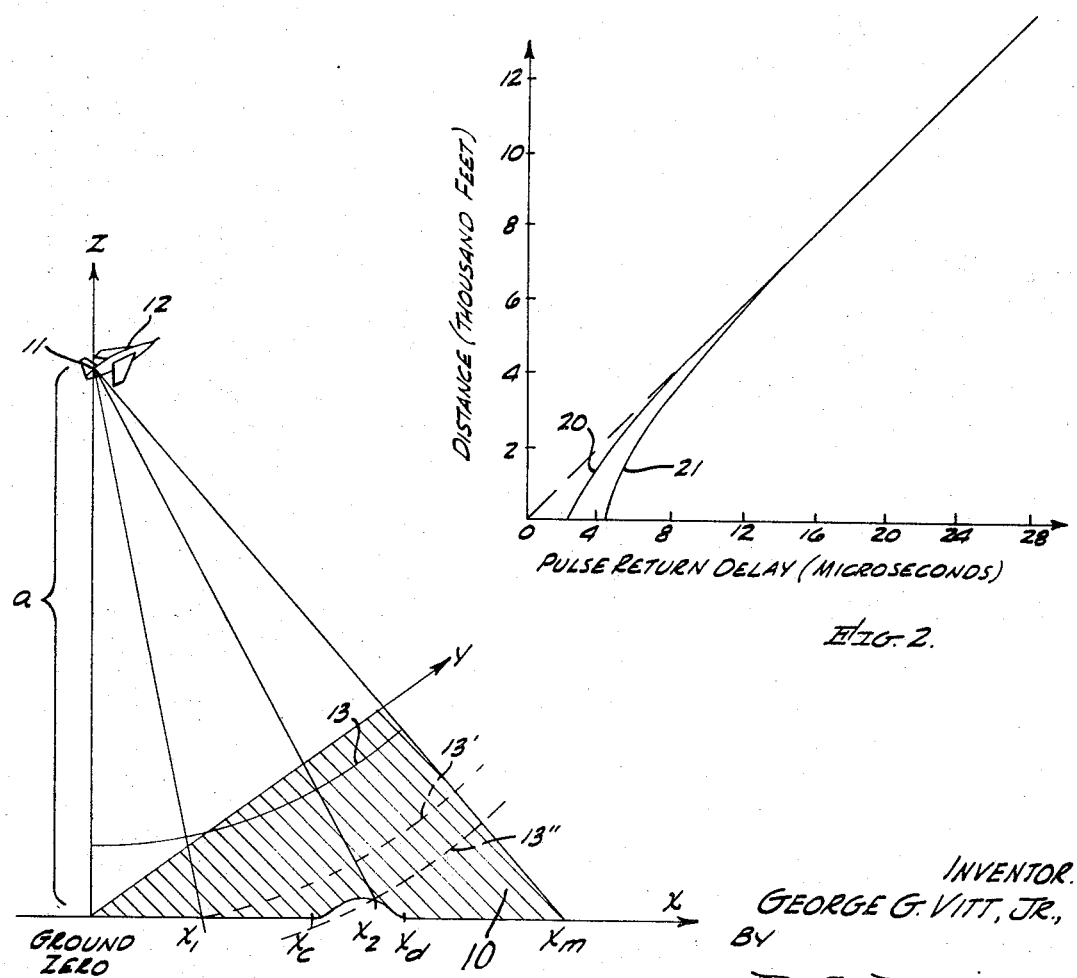
FIG. 2 is a graphical representation of the return delay time of a fan-shaped light beam plotted as a function of distance.

FIG. 2 is a graphical representation of the return delay time of the light pulse plotted as a function of the distance along the x coordinate from ground zero. Curve 20 represents the pulse return delay-versus-distance for an aircraft altitude a of 400 feet. Curve 21 represents the same delay-versus-distance factor for an aircraft altitude a of 1000 feet. As can be seen, there is an initial delay proportional to altitude a before any returned light is received. The pulse return delay from regions farther removed from ground zero is greater the farther the region is along the x coordinate.

Figure 3:
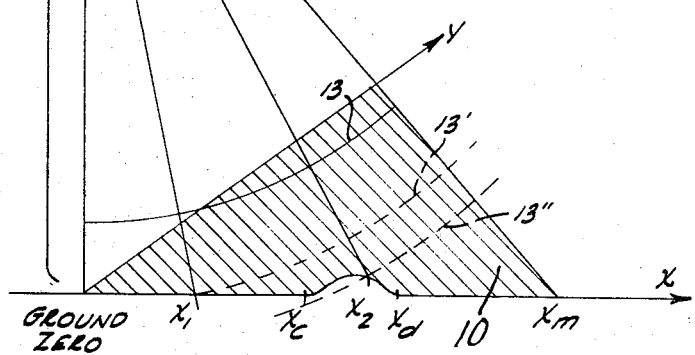
FIG. 3 is a pictorial illustration of irregular terrain.

Curves 20 and 21 of FIG. 2 correspond, of course, to flat and level terrain. Irregularities such as mountains, hills, valleys, etc., alter the return delay time of the light pulse. A simplified illustration of an irregular terrain is shown in the pictorial illustration of FIG. 3. Where appropriate, like characters have been carried over applicable FIG. 1 to designate like figure elements. illustration, In FIG. 3 a terrain irregularity in the form of a small hill is shown between the points $x_c$ and $x_d$ along the x coordinate. For the sake of simplicity only the right half of the terrain area under consideration is shown. It is understood, however, that the description to follow is equally applicable to the left half of the terrain area. For the purpose of illustration two additional wavefronts 13' and 13'' are shown as dashed arcs. Wavefront 13' intersects surface 10 at a point $x_1$ which lies between ground zero and $x_c$. Wavefront 13'', which is actually the same wavefront as it appears a moment later in time, intersects the surface at a point $x_2$ which lies between $x_c$ and $x_d$.

In operation, a narrow strip of terrain lying along the x coordinate is illuminated by wavefront 13, 13', and 13''. The instant at which each particular point is illuminated, however, depends upon the distance to that point from the source 11 of illumination at aircraft 12. Thus, point $x_1$ is illuminated before points $x_c$, $x_d$, etc. Just as an ocean wave gradually breaks along a curving shore line, so wavefront 13 illuminates the terrain at progressively later points in time. In effect, it is as if each region along the strip of terrain from ground zero to the maximum range is illuminated by a spotlight moving above the terrain at a variable velocity.

Of course, this velocity, referred to herein as "ground velocity", is extremely large near ground zero and decreases to substantially the speed of light at very large distances along the x coordinate. Nevertheless, since the magnitude of the ground velocity can be easily calculated for flat and level terrain it is possible to compare it with the ground velocity of light over undulating or obstructed terrain and thereby obtain useful information.

One method of extracting terrain profile information from such an illuminated strip can be readily explained with reference to the pictorial view of FIG. 4. Again, for the sake of simplicity, only one-half of the terrain along the x coordinate will be considered. As before, it is understood that the following description also applies to the other half of the terrain area under observation and that identical apparatus can be utilized for observing that region.

In FIG. 4 the x coordinate has been drawn to a greatly reduced scale in order to facilitate description. In operation, the illuminated strip of terrain from ground zero to the point of maximum range $x_m$ is imaged by lens 40 onto the photocathode 41 of an image intensifier device 42. The line image is shown as arrow OM, the point O corresponding to ground zero and the point M corresponding to the point of maximum range $x_m$. Line image OM is intensified by image intensifier device 42 and displayed on phosphor screen 43. The intensified image is then imaged by means of lens 44 onto the photocathode 45 of the composite image processing device 46 as line O'M'.

Image-processing device 46 is actually two devices combined. The image section 47 can consist of a modified image dissector structure such as that known in the trade as a Reconotron. The "read" section 48 of composite image-processing device 46 can comprise a beam-scanning device such as an image orthicon. Separating image section 47 and "read" section 48 of image-processing device 46 is a dielectric target 49. Dielectric target 49 is of the type capable of retaining a charge pattern for a time much greater than the reflection time from the point of maximum range $x_m$.

In operation, the electrons emitted by the intensified line image O'M' appearing on photocathode 45 of image section 47 traverse the length of the image section. During the course of their traversal they are deflected by a vertical deflection field 50. In the present embodiment the magnitude of deflection field 50 increases linearly with time and is synchronized to begin just as the returned light is received from ground zero. Thus, the electrons impinging upon target 49 trace a curve O''M'' thereon. The coordinate position of any point on curve O''M'' is, therefore, determined by the distance along the x coordinate and the reflection time from the corresponding point of the terrain.

By the process known as secondary emission, electrons are displaced from the regions of target 49 lying on curve O''M'' thereby leaving a net positive charge in these regions. An electron beam 51 provided by an electron gun 52 is directed toward target 49. Horizontal and vertical deflection fields 53 and 54, respectively, provide the proper deflection signals to produce a scanning motion of beam 51. Thus, beam 51 is caused to scan a series of curves or read traces parallel to curve O''M'' in much the same way an image orthicon scans a television image. By virtue of the differences in charge density of the regions of target 49, electron beam 51 is amplitude modulated and reflected as beam 51'.

At the end of each horizontal read trace, horizontal deflection field 53 is stepped up in amplitude a small amount to scan the next parallel read trace. The time taken for the entire read scanning process is largely determined by the number of parallel read scans desired. In general, the resolution of the device is increased by the use of a larger number of closely spaced read traces. In any event, the total time required for "reading" is less than the time lapse between the generated light pulses. Ordinarily, a time of 0.1 to 1 millisecond is adequate for readout.

The readout accomplished by electron beam 51' which has been reflected at target 49 therefore contains information in the form of amplitude modulation which is then preamplified by a photomultiplier device 55 surrounding electron gun 52. The output of photomultiplier device 55 is then coupled out of image-processing device 46 as a video output signal which can be amplified and displayed. The readout thus achieved is destructive, in that the positive charges on target 49 are neutralized by read beam 51. After readout, target 49 is in condition to receive the next image and the process is repeated.

For the sake of clarity, the various focusing, collimating and deflecting electrodes of image-processing device 46 have been omitted from FIG. 4. These elements and their corresponding voltage sources are, however, well known to those skilled in the art.

An enlarged view of the deflected curve O''M'' as it appears on the face of target 49 is shown in FIG. 5A. As mentioned above, curve O''M'' is traced by a beam of electrons, which beam moves from point O'' to point M'' at a velocity proportional to the ground velocity of the terrain illumination. At the same time the beam is deflected vertically by linear deflection field 50. The resultant curve, therefore, contains ripples which represent terrain variations. One such ripple is shown near the center of curve O''M'' as a dashed line segment 56. The curve from O'' to M'' including dashed line segment 56 corresponds to the curve resulting from a terrain having a small hill such as that shown in FIG. 3. A view of this portion of curve O''M'' is shown further enlarged in FIG. 5B.

Read beam 51 produced by electron gun 52 is deflected to produce read traces 57, 58, 59 ...n and which dissect curve O''M'' and line segment 56. The separation $\Delta h$ between each of read traces 57, 58, 59 ...n, as mentioned, depends on the height resolution or contour interval desired.

Figure 6:
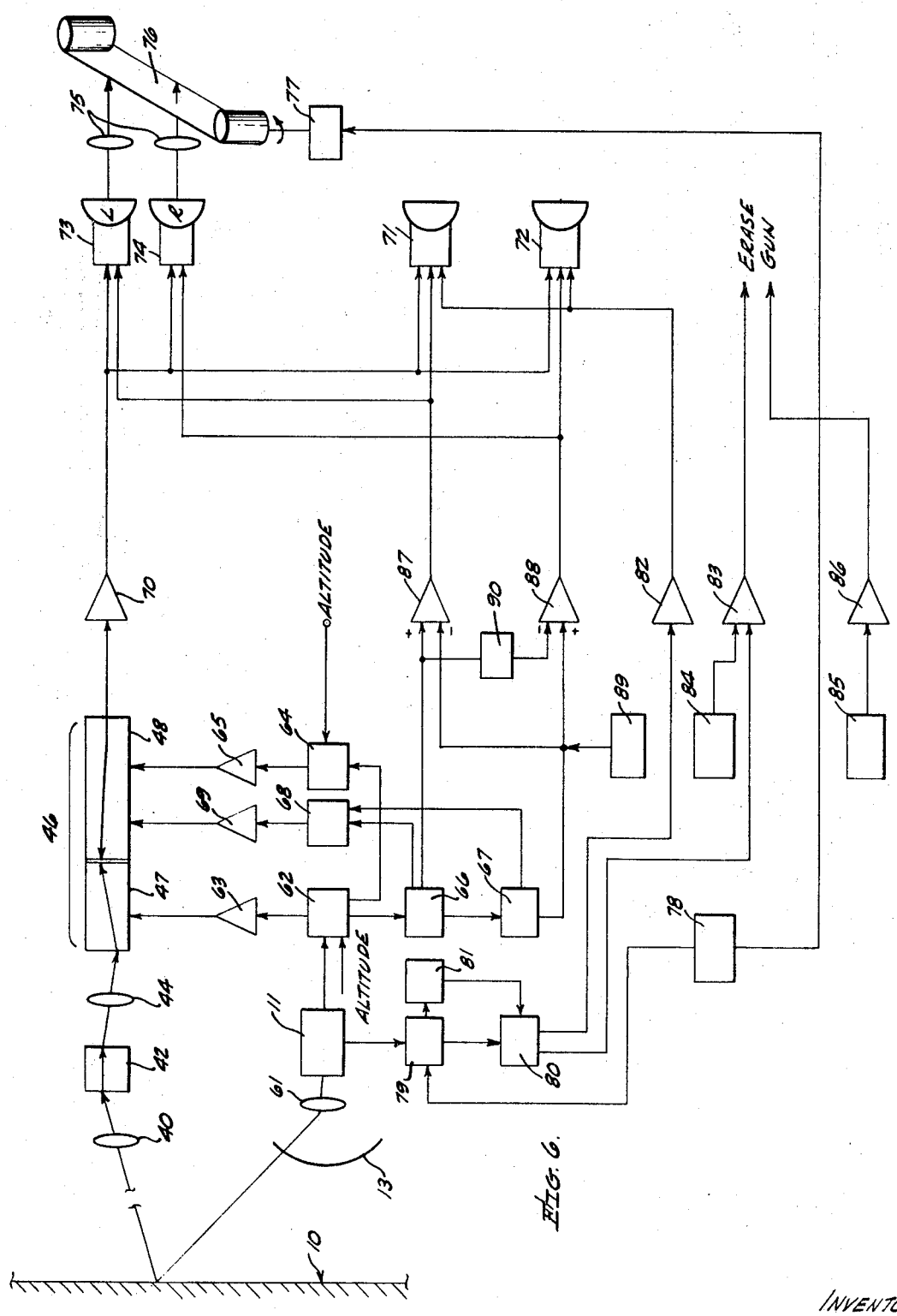
FIG. 6 is a block diagram of one embodiment of the present invention.

A practical circuit for practicing the present invention is shown in the block diagram of FIG. 6 wherein like numerals have been carried over from the previous figures to designate like circuit elements. In FIG. 6 a light source 11 emits short pulses of high frequency electromagnetic wave energy. Because of the many advantages they enjoy, the invention will be described in terms of a laser light source although it is understood that the invention is not to be deemed restricted thereby. Other suitable sources of high intensity radiation can be substituted for the laser.

The light beam emitted by light source 11 is focused by means of an astigmatic lens 61 into an arcuate wavefront 13. Wavefront 13 then illuminates terrain surface 10 as described hereinabove. The light is then reflected by surface 10 and processed as described above in connection with FIGS. 4, 5A and 5B. The light pulse output from source 11 is also coupled to a ramp generator 62. Altitude information from an altimeter, not shown, is also coupled to ramp generator 62 which initiates a linear ramplike voltage at a time corresponding to the light pulse output time (defined hereinabove as t = 0) delayed by the time interval taken for the light reflection from ground zero. The time duration of the ramplike voltage from ramp generator 62 is substantially the same as that taken for the light to make the round trip to the point of maximum range $x_m$.

Ramp generator 62 serves a triple function. First, the output of ramp generator 62 is coupled through deflection amplifier 63 to provide the deflection field 50 for image section 47 of image-processing device 46. Secondly, the output of ramp generator 62 is also coupled to a function generator 64 together with altitude information from the altimeter not shown. Function generator 64, in response to these input signals, generates a nonlinear ramplike voltage which, when amplified by deflection amplifier 65, provides the vertical deflection field 54 for "read" section 48 of image processing device 46.

Thirdly, the output from ramp generator 62 is coupled to the input of another ramp generator 66 which provides an output voltage consisting of a train of linear ramps resembling a sawtooth. The repetition rate of the ramps provided by ramp generator 66 is a multiple of the repetition rate of the light pulses from source 11. The number of ramps thus generated corresponds to the number of read traces 57, 58, 59 ...n mentioned above in connection with FIGS. 5A and 5B. The output of ramp generator 66 is coupled to the input of a staircase generator 67 which generates an output voltage having discrete values which increase at a rate determined by the pulse repetition rate of ramp generator 66. The output of staircase generator 67 is coupled to an adding circuit 68 together with the sawtoothlike output of ramp generator 66. The combined signal is coupled from adding circuit 68 through a horizontal deflection amplifier 69 to furnish the horizontal deflection field 53 for "read" section 48 of image-processing device 46. The video output obtained from image-processing device 46 is coupled to a video amplifier 70 which, in turn, is connected in shunt to the control electrodes of the display devices. In the embodiment of FIG. 6, both visual and photographic display devices are shown, although it is understood that either visual or photographic display devices can be used separately if desired. The visual display devices 71 and 72 for the left and right eyes respectively can be, for example, cathode ray tubes of the stored scan type. One such device suitable for this purpose is Hughes Aircraft Company's multimode TONOTRON. Photographic display devices 73 and 74 for left and right eye stereoscopic display respectively, can be, for example, cathode ray tubes of the line-scan variety.

For photographic display and recording, appropriate lenses 75 focus the line image output of display devices 73 and 74 on a moving photographic film 76. Photographic film 76 is advanced at a speed proportional to the ground speed of the aircraft by means of a ground speed servomechanism 77 which obtains information from ground speed indicator 78. The stereoscopic visual display is treated in greater detail hereinbelow. For the sake of clarity, the beam forming and focusing electrodes of display devices 71, 72, 73 and 74 have been omitted from the block diagram of FIG. 6 as have the various power supplies. The employment of these elements, however, is well known to the technician skilled in the art.

Ground speed indicator 78 also provides a direct current voltage proportional to ground speed to a level sampling device 79. Level sampling device 79 also accepts pulses from light source 11 and thus provides an output signal consisting of pulses having the same repetition rate as those generated by light source 11 and having magnitudes proportional to the ground speed of the aircraft. The pulse output of level sampling device 79 is coupled to an integrator circuit 80 which provides a staircaselike output voltage, the magnitude of each step being proportional to the ground speed of the aircraft. Integrator circuit 80 is automatically reset at the end of a predetermined number of steps by means of a counter circuit 81. The integrator circuit output is coupled to a deflection amplifier 82 to provide a vertical deflection field for visual display devices 71 and 72.

The output from integrator circuit 80 is also coupled to a deflection amplifier 83 which provides a vertical deflection signal for the erase beams of visual display device 71 and 72. An "offset" signal provided by device 84 insures that the erase beams of display devices 71 and 72 precede the write beams by a small amount. The horizontal deflection field for the erase gun is provided by a sawtooth generator 85 and deflection amplifier 86. Thus, the old images are erased from the viewing surfaces of visual display devices 71 and 72 just before the new images are traced.

The block diagram of FIG. 6 is completed by the horizontal deflection circuits for display devices 71, 72, 73 and 74. These circuits comprise a pair of deflection amplifiers 87 and 88 which are coupled to the left eye display devices 71 and 73 and the right eye display devices 72 and 74 respectively. The horizontal convergence of the left and right stereoscopic images, to be described in greater detail hereinbelow, is provided by an output from staircase generator 67 which is coupled to the positive input terminal of amplifier 88 and the negative input terminal of amplifier 87. The convergence level is established by a controllable direct current voltage from convergence level selector 89. The horizontal deflection input signal is provided by an output of ramp generator 66 which is coupled to the positive input terminal of amplifier 87 and through an inverter circuit 90 to the negative input terminal of amplifier 88.

Figure 7:
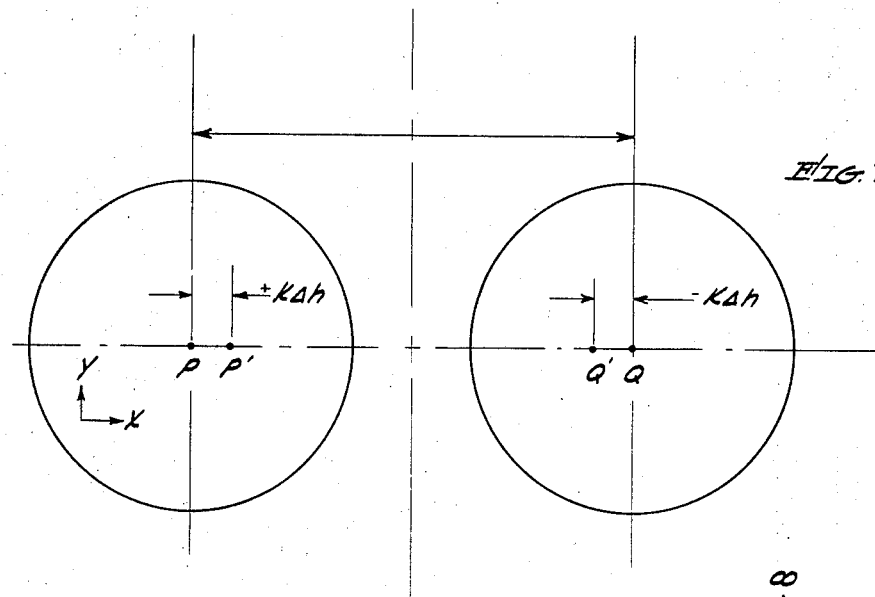
FIGS. 7, 8 and 9 are diagrams illustrating the operation of the visual stereoscopic display mechanism of the embodiment of FIG. 6.
Figure 8:
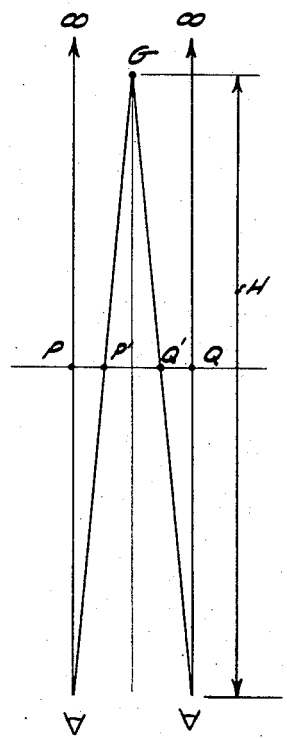

The mechanics of the stereoscopic display can be readily explained with reference to the diagrammatic views of FIGS. 7 and 8. In FIG. 7, there is shown a diagram of the face of the visual display devices such as those designated 71 and 72 in FIG. 6. FIG. 8 is a diagram of the top view of the same display devices. The distance between points P and Q on the faces of the display devices is adjusted to correspond to the interpupillary separation of the observer. When thus adjusted an observer will appear to see one imaged spot at infinity. If points P and Q are each moved a distance $(k\Delta h)$ toward the cycloptic center of the observer to correspond to points P' and Q' the visual parallax angle is increased. The observer will interpret the change as a movement of the imaged point toward him to point G shown in FIG. 8. When both points P' and Q' are scanned at the same time rate while maintaining the convergence angle, point G will appear to move in a plane substantially perpendicular to the line of sight of the observer at a distance H from him. Thus the third dimension H depends upon the convergence angle which in turn is proportional to the push-pull deflection of the left and right eye information.

The operation of the stereoscopic display can be more readily understood by considering the trace patterns of FIG. 5B in conjunction with the diagrams of FIGS. 7 and 8. Assuming that the first read trace of the "read" section of the image processing device coincides with curve O''M'', then a pair of lines will be traced on the faces of visual display devices 71 and 72 by a pair of moving spots which at every instant are separated by the interpupillary separation of the observer. Thus the lines will appear to the observer as one line lying in a plane an infinite distance away. As indicated above, however, this apparent distance is a function of the convergence angle presented by the spots and can be decreased at the will of the observer by adjustment of convergence level selector 89 of FIG. 6. The line thus written will have a brightness corresponding to the reflectivity of the observed terrain and will be dark in the region corresponding to line segment 56.

Figure 9:
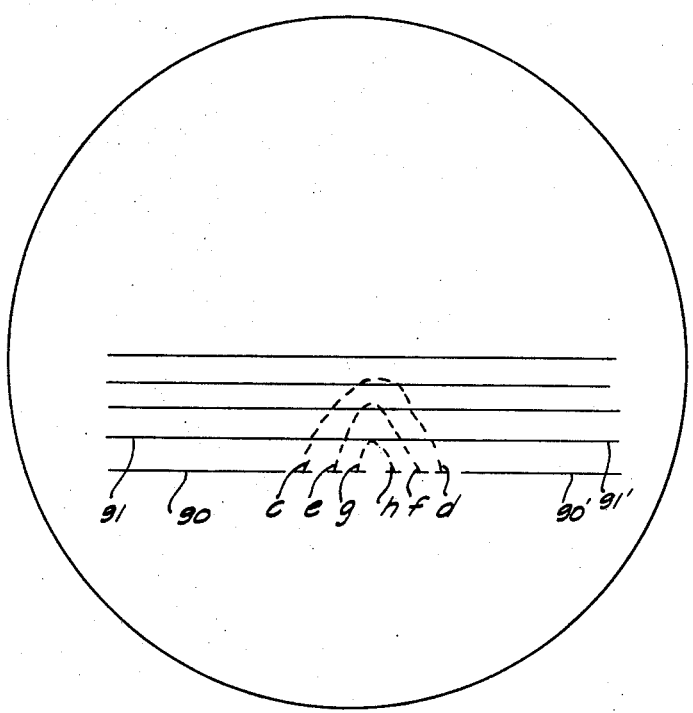

The pattern seen by the observer is shown in the frontal view of FIG. 9. In FIG. 9 line segments 90 and 90' represent the bright regions of the first line. The second lines written on the face of visual display devices 71 and 72 are collinear with the first lines and are produced by a pair of moving spots which are at every instant separated by a distance slightly less than the interpupillary separation. The change in separation of these spots is proportional to the distance $\Delta h$ between curve O''M'' and second read trace 57. Since read trace 57 intersects curve O''M'' at only two points on line segment 56 the resulting pattern produced on the faces of visual display devices 71 and 72 will appear as two bright spots c and d apparently lying in a plane a distance $(k\Delta h)$ closer to the observer. Subsequent lines are written on display devices 71 and 72 corresponding to the number of read traces utilized in the "read" section of image-processing device 46. In the illustrative example of each of these lines will produce bright spots e and f and g and h, each pair of which will appear to lie in planes proportionately closer to the observer.

After curve O''M'' has been "dissected" by all of the read traces 57, 58, 59, ...n a new light pulse is emitted and the process is repeated. The information obtained from the new terrain image is written on display devices 71 and 72 as before but in a separate line designated 91-91'. The vertical separation between the new line 91-91' and line 90-90' is, as indicated above, proportional to the ground speed of the aircraft.

It is obvious that the above description of visual display devices 71 and 72 also applies to photographic display devices 73 and 74, except that the vertical separation between adjacent lines is provided by the motion of the photographic film, which is synchronized with the aircraft ground speed.

In all cases it is understood that the above described arrangements are illustrative of but a small number of the many specific embodiments which can represent applications of the principles of this invention. Numerous and varied other arrangements can readily be devised in accordance with these principles by those skilled in the art without departing from the spirit and scope of this invention.

I claim:

1. A three-dimensional terrain-mapping system adapted for airborne operation comprising, in combination, means for sequentially illuminating substantially parallel narrow strips of said terrain with high intensity light pulses having arcuate wavefronts, means for imaging the light reflected by said terrain as one-dimensional images on the photocathode of an image-processing device, said image-processing device including means for deflecting each point of said images an amount proportional to its reflection time from said terrain, means for comparing each of said deflected images with a plurality of reference images, said reference images corresponding to those obtained by light reflected from level terrain of different heights, said image-processing device including further means for producing an output in response to coincident points of said deflected and said reference images, and means for displaying said output stereoscopically.

2. The system according to claim 1 wherein said imaging means includes an image intensifier.

3. The system according to claim 1 wherein said display means comprises a pair of electron beam-scanning devices.

4. The system according to claim 3 including further means for photographically recording said stereoscopically displayed output.

5. The method of obtaining three-dimensional terrain maps from a moving airborne vehicle comprising the ordered steps of:

generating a series of pulses of high intensity light;
focusing each of said pulses into fan-shaped light beams directed toward said terrain;
focusing the light reflected by said terrain into one-dimensional images;
converting each of said one-dimensional images into two-dimensional images;
comparing each of said two-dimensional images with images resulting from light reflected by level terrain; and
displaying the compared information stereoscopically.

6. The method according to claim 5 including the further step of photographically recording said stereoscopically displayed information.

7. A three-dimensional terrain mapping system adapted for airborne operation comprising, in combination:

means for illuminating successive regions of a narrow strip of said terrain with high intensity light, said successive regions being illuminated at times corresponding to the respective distances to each of said regions from said illuminating means;

means for imaging the light reflected by said illuminated regions;

means for comparing said image with a plurality of reference patterns which correspond to the images resulting from light reflected by level terrain;

said comparing means including means for scanning an electron beam in parallel traces corresponding to said reference patterns;

means for producing an output in response to coincident points of said image and said reference patterns to indicate said distances; and means for displaying said output stereoscopically.

8. The system according to claim 7 wherein said illuminating means comprises a laser.

9. The system according to claim 7 comprising additional means for photographically recording said stereoscopically displayed output.